Nov. 22, 1938.     R. CHILTON     2,137,390
ROTARY VALVE AND SEAL THEREFOR
Filed Jan. 9, 1937     2 Sheets-Sheet 1
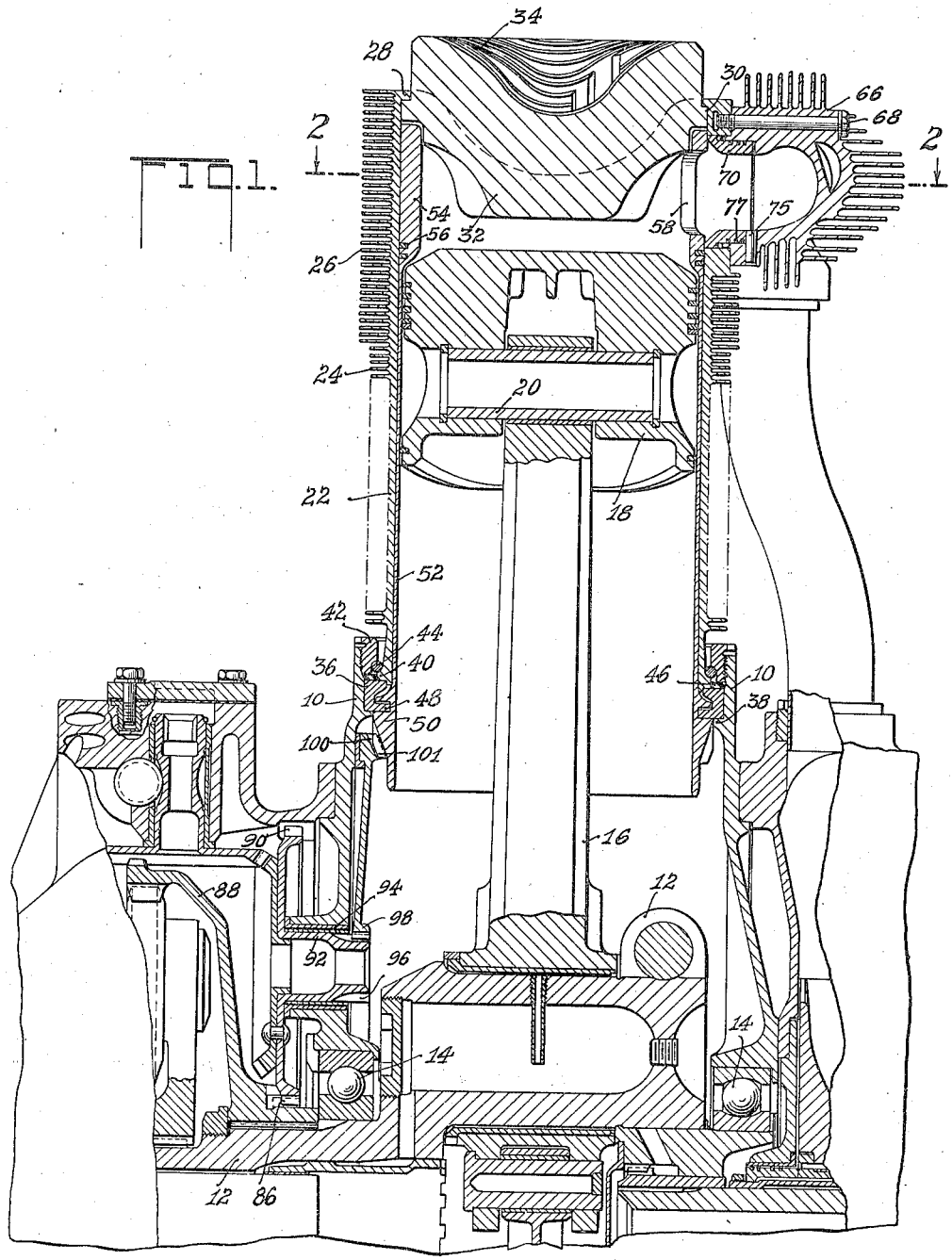
INVENTOR.
ROLAND CHILTON
BY
ATTORNEY.

Nov. 22, 1938.    R. CHILTON    2,137,390
ROTARY VALVE AND SEAL THEREFOR
Filed Jan. 9, 1937    2 Sheets-Sheet 2
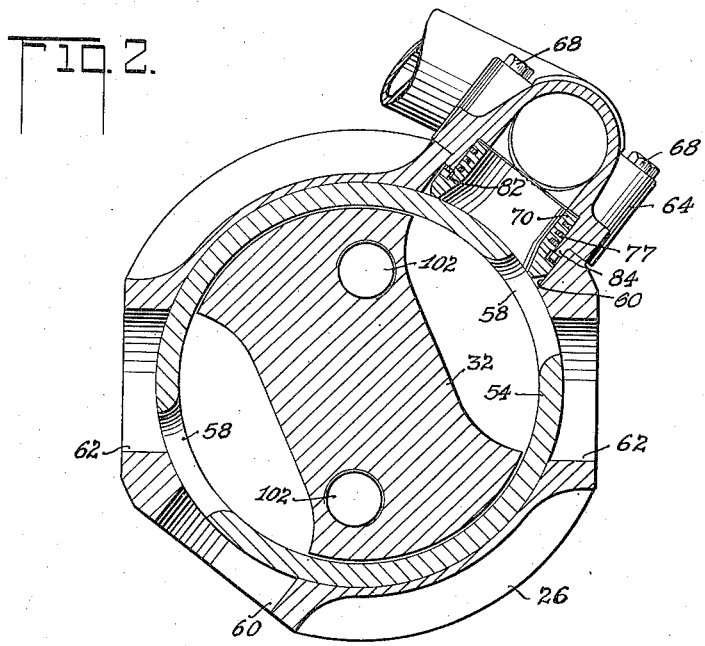
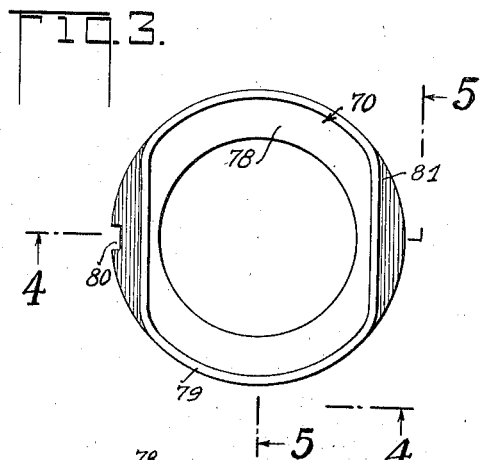
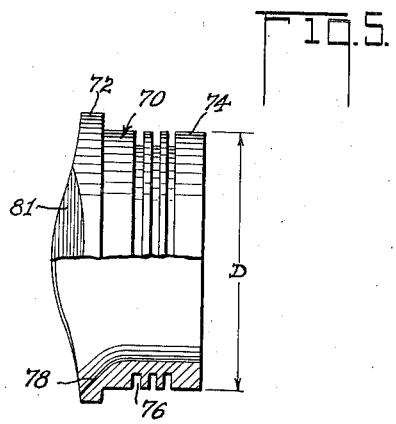
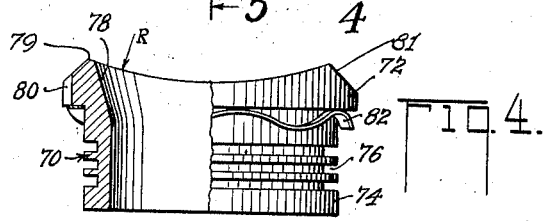
INVENTOR.
ROLAND CHILTON
BY
ATTORNEY.

Patented Nov. 22, 1938

2,137,390

UNITED STATES PATENT OFFICE 2,137,390

ROTARY VALVE AND SEAL THEREFOR

Roland Chilton, Ridgewood, N. J., assignor, by mesne assignments, to Wright Aeronautical Corporation, Paterson, N. J., a corporation of New York Application January 9, 1937, Serial No. 119,727

9 Claims. (Cl. 123—80)

This invention relates to improvements in rotary valves and in engine structures incorporating such valves, the specific embodiment of the drawings being suited for a radial aircraft engine.

Objects of the invention include the provision of a simplified valve driving mechanism; improved means for locating the valve against axial thrust; and an improved means for securing the cylinder to the crankcase, particularly suitable for use in connection with the previously mentioned thrust means.

Further objects are: The provision of an improved and simplified cylinder head attachment means, the provision of improved valve sealing means, with particular respect to the ready accessibility of the valve sealing elements. A further object resides in an improved port disposition, particularly suited for adequate cooling fin arrangement.

Other objects and advantages will be obvious from, or will be pointed out in the following description, with reference to the drawings in which:

Fig. 1 is a longitudinal section thru the cylinder axis of an engine embodying the invention, with the crankshaft, crankcase and associated parts shown in fragmentary view, Fig. 2 is a cross section on the line 2—2 of Fig. 1, Fig. 3 is an enlarged face view of the valve sealing number, Fig. 4 is a fragmentary section on the line 4—4 of Fig. 3, and Fig. 5 is a fragmentary section on the line 5—5 of Fig. 3.

Referring first to Fig. 1, 10 designates a crankcase in which is supported a crankshaft designated in general by the numeral 12, supported in bearings 14 in the usual way. The crankshaft is equipped with a conventional connecting rod 16 operating a conventional piston 18 through a piston pin 20 as usual.

A cylinder 22 is equipped with cooling fins 24, 26 and at its upper end with an inturned flange 28 against which there is abutted a shoulder 30 of a cylinder head 32 equipped with cooling fins 34.

The crankcase is formed cylindrically about the base of the cylinder 22 and is equipped with a halved thrust ring 36 which abuts a shoulder 38 formed in the crankcase and against the top of which ring a base flange 40 of the cylinder abuts. The crankcase 10 is internally threaded to receive an annular nut 42, the nut having a bore which will just pass over the flange 40. The opposed faces of the nut and cylinder flange are provided with seats between which a preferably circular section ring 44 is clamped, the ring being split so that it may be sprung over the outside diameter of the flange 40 after the nut 42 has been passed over this flange. The annulus 46 preferably of rubber, indicates a soft packing whereby the cylinder-to-crankcase joint is rendered oil tight.

It will be seen that the halved ring 36 is provided with an inwardly extending annular foot or flange 48 engaged in a suitable groove formed in the thickened portion 50 at the bottom of a sleeve valve 52 which is fitted within the cylinder 22 wherein the sleeve extends upwardly to a substantially thickened portion 54 above the piston 18. The thickened upper end 54 of the rotary sleeve valve 52 is provided with piston ring type seals 56 and with a pair of opposite ports 58 (see also Fig. 2).

The upper part of the cylinder is provided with two circular inlet ports or openings 60 and with two exhaust port openings 62 with which the ports 58 of the rotary valve 52 cooperate. Fitted in these ports are inlet and exhaust elbows, one of the former being indicated at 64 in Fig. 2 and one of the latter at 66 in Fig. 1, these elbows being secured to the cylinder by screws 68 threaded therein.

Each of the ports is provided with an annular piston sealing device 70 shown in large scale in Figs. 3, 4 and 5 comprising a cylindrical head 72 fitted to the cylinder port bores 60 and 62 and a cylindrical extension 74 fitted in a bore in the respective elbows 66, 68 and provided with grooves 76 equipped with piston rings 77. The device 70 is located circumferentially by a dowel 75. The sealing face 79 of the valve has a radius R (Fig. 4) equal to the outer radius of the sleeve 52 and it will be seen that the bore of the sealing device is flared at 78 (Fig. 5), the area of the opening provided by this flare being greater than the area due to the extension 74, diameter D. A vent slot 80 is provided in the cylindrical head 72 of the sealing piece whereby pressure from the clearance space between the rotary valve 52 and the cylinder is at all times effective on the net piston area comprising the difference between the area of the head 72 less the area of the extension 74, and the area of the head 72 less the area within the profile of the valve seat 79. The valve seat 79 is formed as a sort of oval, by flat portions 81, reducing the circumferential width of the sealing device 70 relative to the sleeve 52 for facilitating sleeve timing characteristics, while maintaining an adequate port area. A waved spring 82 is provided between the bead 72 and a pilot 84 of the elbows 64, 66 to exert light initial load of the sealing device 70 against the sleeve.

The sealing device functions as follows: The area of the sealing face 79 is indicated as $A_1$ and is governed by the outside area of the head 72 minus the area embraced by the flare 78. The area at the rearward part of the sealing head 72 is indicated at $A_2$ and is governed by the difference in diameter between the outside diameter of the head 72 and the diameter of the piston 74. Since the area due to D is less than the area due to the flare 78, $A_2$ is greater than $A_1$. When a valve port is closed, high pressures develop between the cylinder wall and the valve sleeve 54 due to leakage of gases therebetween through the sleeve port 58. These pressures tend to unseat the sealing device 70 to allow of leakage into the cylinder ports which are at substantially atmospheric pressure. But, by the vent slot 80, the unit pressure behind the sealing head 72 is equal to that on its face, the difference in total pressure acting on $A_1$ and $A_2$ serving to press the sealing device against the valve sleeve 54 to prevent leakage into the cylinder ports. In effect, the sealing device 70 presses harder on the sleeve in proportion to pressure increases within the cylinder, and presses lightly, with consequent diminution in wear, when the cylinder pressures are low. The indicated functioning takes place when the cylinder and sleeve ports are relatively closed. When open, no sealing pressure is needed.

The valve driving mechanism is as follows: The crankshaft 12 is provided with a gear 86 (in this instance shown as integral with a large planetary bell gear 88) and meshed with this gear 86 are a plurality of circumferentially spaced gears 90 integral with hubs 92 supported in bearings 94 in the crankcase wall and projecting therethrough to comprise pinions 96 which are in turn engaged with an annular gear 98 on the exterior of which are formed bevel gear teeth 100 meshed with companion bevel gear teeth 101 cut upon the lower end of the sleeve 52.

The cylinder head is provided with holes 102, (Fig. 2) for conventional spark plugs. The details shown at the extreme right and left hand sides of Fig. 1 comprise fragmentary sections thru conventional supercharger and accessory drives not forming a part of the present invention.

Referring now to the cylinder abutment and sleeve locating thrust ring 36, it will be seen that this comprises an annular thrust bearing for the sleeve 52, located within the crankcase where it will be subject to oil splash for automatic lubrication and that this construction increases the bore of the cylinder receiving projection 10 on the crankcase. For this reason, there would be excessive overhang if it were attempted to use the conventional flange-and-stud cylinder-to-crankcase attachment. The split ring 44 and annular nut 42 comprise one of the novel features of a copending application, providing a cylinder attachment particularly suited to this environment.

It will be understood that the cylinder 22 is made a shrink or force fit at 30 upon the head 32 making a simple joint wherein the explosion loads are resisted by the flange 28 integral with the cylinder.

It will also be seen that the annular piston type sealing rings 70 are at all times pressed against the interior surface of the sleeve 52 with a pressure that is proportional to the instantaneous internal pressure in the cylinder whereby leakage is prevented independently of the running fit between the sleeve 52 and the bore of the cylinder 22.

It will also be seen that, by the duplicate port disposition, the explosion loads on the sleeve are balanced to the elimination of lateral forces between the sleeve and the cylinder and that there is afforded, in between the ports, space for a substantial length of finning as indicated at 26 (Fig. 2).

It is also pointed out that by merely detaching the port elbows 68 or 66 the associated sealing ring 70 may be disassembled and replaced without disturbing any other parts. This improved accessibility comprises one of the features of the invention.

While I have described my invention in detatil in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In an engine, in combination, a crankcase having a cylinder receiving opening having an abutment, a sleeve valve member, a split ring member, said members having a cooperating flange and groove connection for relative axial location, said split ring being seated in said opening against said abutment, a cylinder having a base portion in said opening, and means to hold said base portion against said split ring.

2. In an engine, in combination, a crankcase having a cylinder receiving opening having an abutment, a sleeve valve member, a split ring member, said members having a cooperating flange and groove connection for relative axial location, said split ring being seated in said opening against said abutment, a cylinder having a base portion in said opening, and means to hold said base portion against said split ring, said means comprising a flange on the cylinder base portion, an annular nut having an inner diameter clearing the outer diameter of said flange, a ring insertable between said flange and nut, and threads in said cylinder opening with which said nut engages to hold said ring against the cylinder flange, and said flange against said split ring.

3. In an engine, in combination, a crankcase having a cylinder opening, a sleeve valve provided with a groove and extending thru said opening, and a split thrust ring seated in said crankcase opening having a portion engaging said groove for axial location of said sleeve valve.

4. In an engine, in combination, a crankcase having a cylinder opening, a sleeve valve provided with a groove and extending thru said opening, a split ring engaged in said opening and engaging said groove, a cylinder having a flange abutting said ring and means to secure said cylinder in abutted relation.

5. In an engine, in combination, a cylinder, a piston, a sleeve having a relatively thin portion between said cylinder and said piston and a substantially thickened portion above said piston, ports in said thickened portion, cooperating ports in said cylinder, annular sealing means having a head fitted to said cylinder ports and a piston portion of reduced diameter, and a port element into which said reduced piston portion is fitted to define an annulus back of said head, said sealing means contacting said sleeve and having a bore flared so that the area within said contact is greater than the area of said piston portion.

6. In an engine, in combination, a rotary valve having ports, a cylinder having cooperating ports, a port element, a sealing means fitted to said cylinder ports and in said port element on differential diameters defining an annulus, and means to convey cylinder pressure to said annulus, said sealing means having an opening against said sleeve of greater area than that defined by the lesser of said differential diameters.

7. In an engine, in combination, a rotary valve having a port, a cylinder having a port bore cooperating with said port, a port element having a bore smaller than said cylinder port bore, a sealing ring member engaging both said bores and having an opening against said sleeve of greater area than that of the smaller bore, and means to detachably secure said port element to said cylinder for removeal of said sealing means without disturbing other parts.

8. In an engine, in combination, a rotary valve having a port, a cylinder within which said valve is movable, said cylinder having a port with which the valve port at times registers, said cylinder port being formed as a stepped cylindrical bore of larger diameter close to said valve and of smaller diameter remote from said valve, a sealing ring seated in said bores having a head portion including a face contactable with said valve, said ring, at said face, having an encompassed area greater than the area of said smaller cylindrical bore, and means to balance unit working fluid pressures upon both sides of said sealing ring head portion.

9. In an engine, in combination, a rotary valve having a port, a cylinder within which said valve is movable, said cylinder having a port with which said valve port at times registers, a sealing ring in said cylinder port for sealing contact with said valve, said ring having a central passage at substantially atmospheric pressure, and a head on said ring subject to substantially cylinder pressures on both that side adjacent the valve and on that side remote from the valve, said remote side having a greater surface area than said adjacent side whereby a differential force is set up due to pressure acting on the head to urge said sealing ring into contact with said valve.

ROLAND CHILTON.